Dec. 21, 1948.   W. E. MARTIN   2,456,719
VEHICLE TANDEM AXLE RUNNING GEAR

Filed April 20, 1946   4 Sheets-Sheet 1

INVENTOR.
W. E. MARTIN
BY
Merrill M. Blackburn.

Dec. 21, 1948.  W. E. MARTIN  2,456,719
VEHICLE TANDEM AXLE RUNNING GEAR
Filed April 20, 1946  4 Sheets-Sheet 2

INVENTOR.
W. E. MARTIN
BY
Merrill M. Blackburn

Dec. 21, 1948.   W. E. MARTIN   2,456,719
VEHICLE TANDEM AXLE RUNNING GEAR
Filed April 20, 1946   4 Sheets-Sheet 3
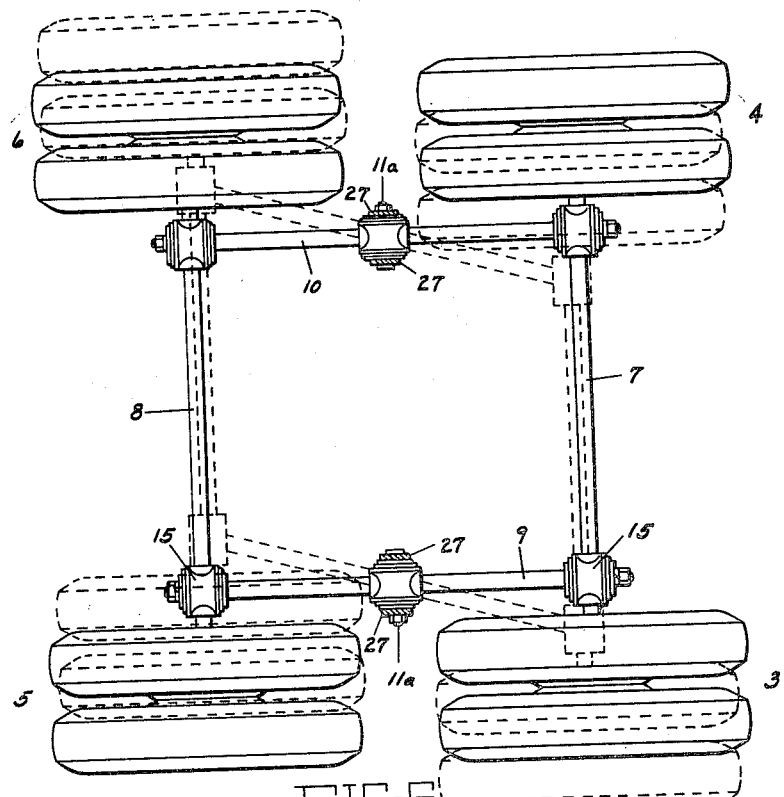
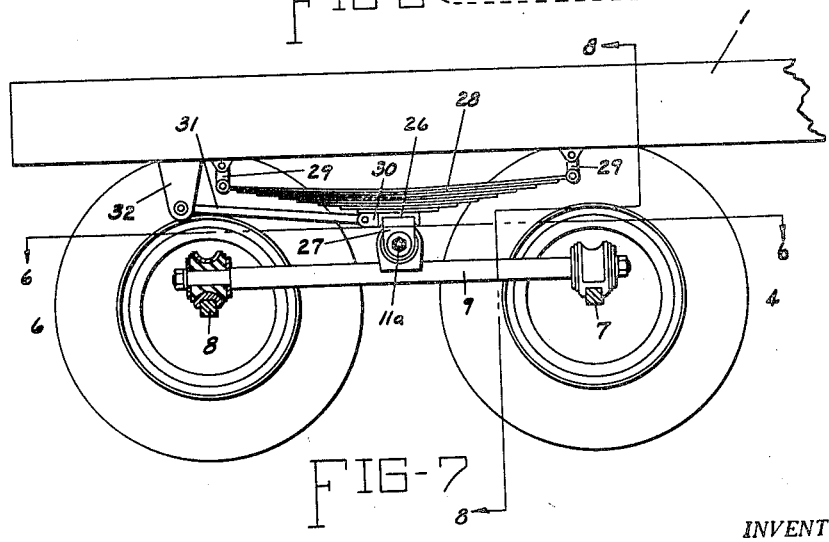
INVENTOR.
W. E. MARTIN
BY
Merrill M. Blackburn.

Dec. 21, 1948.     W. E. MARTIN     2,456,719
VEHICLE TANDEM AXLE RUNNING GEAR
Filed April 20, 1946     4 Sheets-Sheet 4

INVENTOR.
W. E. MARTIN
BY
Merrill M. Blackburn.

Patented Dec. 21, 1948

2,456,719

UNITED STATES PATENT OFFICE 2,456,719

VEHICLE TANDEM AXLE RUNNING GEAR

William E. Martin, Kewanee, Ill.

Application April 20, 1946, Serial No. 663,654

1 Claim. (Cl. 280—104.5)

My present invention relates to the running gear of a vehicle, sometimes referred to as a tandem axle. Among the objects of this invention are the provision of a flexible running gear for a vehicle supported on tandem axles; the provision of a running gear for the purpose indicated in which the separate units of the tandem axle may shift laterally in going around a corner so as to reduce the amount of the side slip or scuffing of the tires and thereby reduce tire wear; the provision, in a structure of the character indicated, of means permitting one unit of a tandem axle to drop into a hole or ride over an obstruction without transmitting to the supported vehicle body an undue amount of the effects of the depression or obstruction; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention and a modification thereof, I desire the same to be understood as illustrative only and not to be interpreted in a limiting sense.

In the drawings annexed hereto and forming a part hereof,

Fig. 6 is a plan view of the tandem frame and wheels, showing in broken lines the type of action which takes place in going around a corner, this figure being in the nature of a horizontal section approximately along the plane indicated by the line 6—6, Fig. 7;

Fig. 7 represents a sectional elevation outside of the trailer frame and partly through one of the flexible bearings of the tandem frame;

Figure 1:
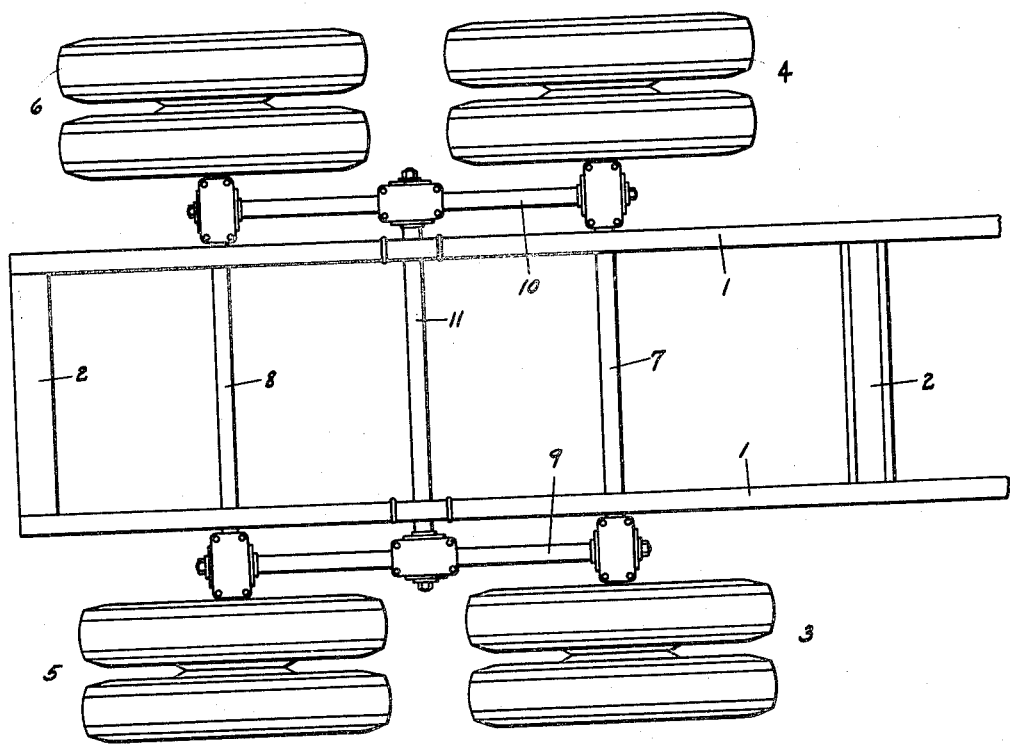
Fig. 1 is a plan view of a tandem axle embodying my present invention with the vehicle frame shown as supported thereon.
Figure 2:
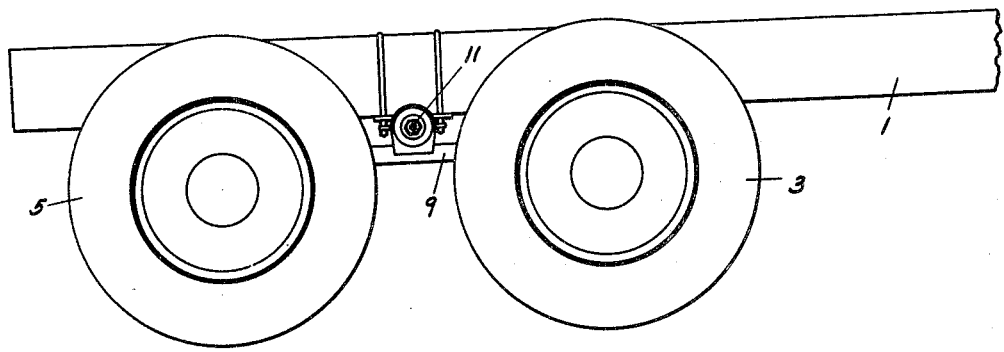
Fig. 2 represents a side elevation of the structure shown in Fig. 1.

Reference will now be made in greater detail to the annexed drawings for a more complete description of this invention. The vehicle frame is shown as comprising a pair of side frame members 1 and a plurality of cross tie members 2 connecting the members 1. The running gear is shown as comprising four pairs of wheels denoted collectively by the numerals 3, 4, 5, and 6, axles 7 and 8, and connecting supporting members 9, 10, and 11. The axles 7 and 8 are provided at their ends with the usual mounting means for wheels.

In order to permit a certain amount of freedom of action at the corners of the tandem frame, a resilient material, such as rubber sleeves under compression, is used between the moving parts, as is shown in Figs. 3, 4, 5, and 9. The rubber is under sufficient compression to cause it to adhere to the metal parts with which it is in contact and relative movement of these parts therefore causes distortion of the rubber parts under operative running conditions as the wheels follow road contours and lateral curves.

Figure 3:
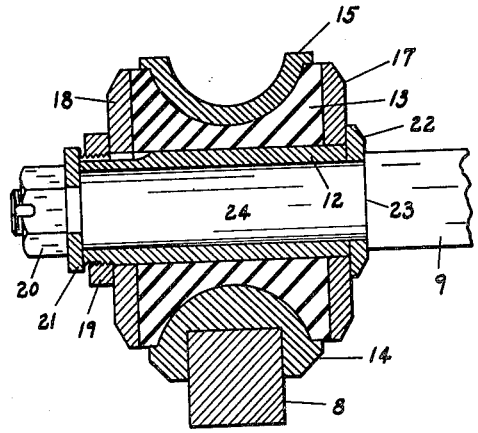
Fig. 3 represents a longitudinal section of a flexible connection at one end of an axle.
Figure 4:
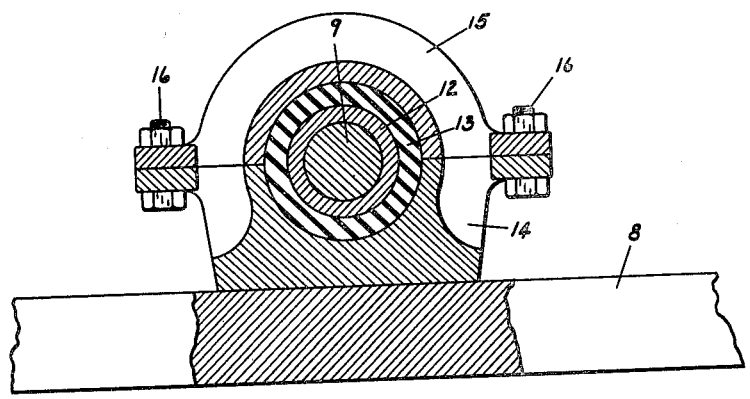
Fig. 4 represents a central vertical section through the structure shown in Fig. 3.

The type of construction for connecting the members 7, 8, 9, and 10 is shown in Figs. 3, 4, 5, 9, 11, and 12, the structure shown in Figs. 3 and 4 differing from that shown in the other figures by reason of the fact that it has a metallic sleeve 12 inside of the rubber sleeve 13. Since the axles 7 and 8 are identical, it will be understood that any description referring to one of them is to be interpreted as applying to the other one, also.

In the structure shown in Figs. 3 and 4, the metallic sleeve 12 is forced into or bonded to the rubber sleeve or bushing 13, and then this is mounted in the lower half 14 of the housing constructed and adapted to clamp the rubber tightly. The upper half or cap 15 of this housing is fastened to the lower half by bolts 16, the nuts of which may be tightened up to squeeze the rubber into tight engagement with the sleeve 12. The rubber is also confined laterally between the washers 17 and 18, the latter of which is forced inwardly by the nut 19. From the foregoing, it will be clear that the rubber bushing 13 is forced into very tight engagement with the sleeve 12 and its housing 14, 15.

Figure 5:
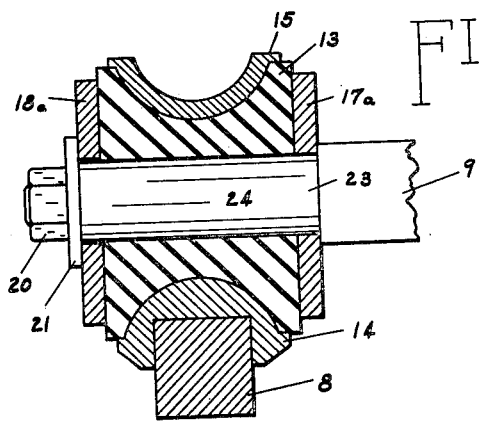
Fig. 5 represents a modified form of the structure shown in Fig. 3.

It is apparent that, by tightening up the nut 20 against the washer 21 which engages the end of sleeve 12, the latter can be forced against the washer 22 which bears against the shoulder 23 of the bar 9. If this nut 20 is tightened sufficiently, the sleeve 12 will be held against rotation on the reduced end of bar 9 but flexure of the rubber bushing 13 will permit relative movement between the bars 8 and 9. If desired, the parts 12, 19, and 22 may be omitted, as shown in Fig. 5. In this case, the washers 17a and 18a replace the washers 17 and 18. Also, the confinement of the rubber is achieved the same way as in the structure previously described, except that the bushing 13 is connected with or forced directly upon the reduced end 24 of the bar 9. Consequently, the rubber contacts or adheres directly to the end portion of this bar rather than to an intermediate sleeve 12. In the latter construction and in the structure of Figs. 3 and 4, limited twisting is permitted in conjunction with the relative movement of the connected bars, vertically or horizontally.

Figure 8:
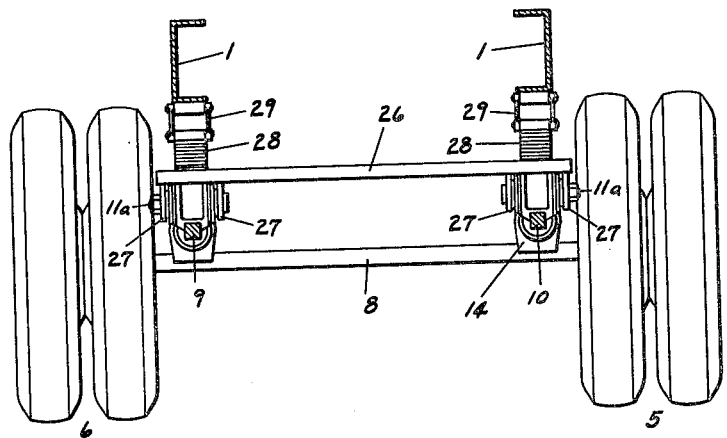
Fig. 8 represents a vertical transverse section approximately along a broken plane indicated by the line 8—8, Fig. 7.
Figure 10:
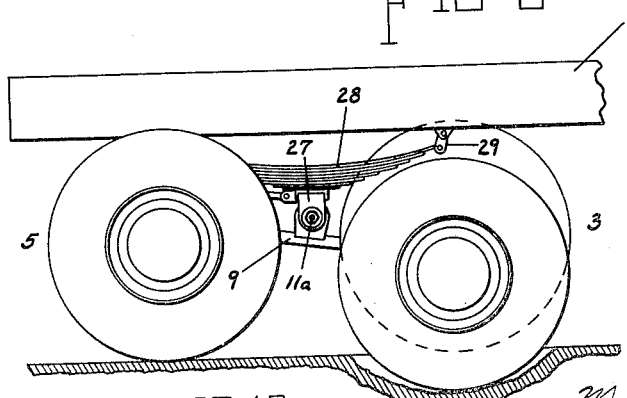
Fig. 10 represents a fragmentary side elevation showing the effect of one of the tandem units dropping into a depression.

The structure shown in Figs. 7, 8, and 10 is similar to that described above but there are certain differences which will now be pointed out. For example, a channel bar 26 provided with downwardly extending ears 27 cooperates with an axle made up of a pair of short axles 11a in supporting the vehicle frame on the tandem frame. Springs 28 rest on the channel bar 26 and are secured thereto, these springs being provided at both ends with spring shackles 29 which allow for the necessary freedom of action between the vehicle frame and the running gear. Ears 30 are secured to the channel bar 26, as shown in Fig. 7, and are connected by a link 31 to ears 32 extending downwardly from the vehicle frame members 1. These act as stabilizers for the running gear to keep it properly aligned when the wheels move up and down, due to inequalities in the road surface. It will also be noted that, as the channel bar 26 moves up and down relatively to the vehicle frame, it tends to move in a short arc which would cause it to move slightly forwardly and backwardly relatively to the ears 32. This is accommodated for by the spring shackles 29. Also, if there is greater or less of this motion on one side than the other, these spring shackles will allow the same to take place.

The resiliency of the rubber bushings 13, while permitting relative sidewise movement of the tandem wheels, still tends to keep them in alignment while moving straight ahead.

Figure 11:
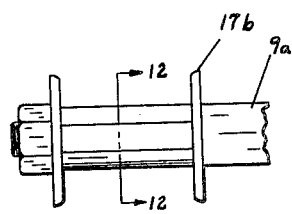
Fig. 11 is a fragmentary view of a modified form of an end portion of one of the tandem frame units.
Figure 12:
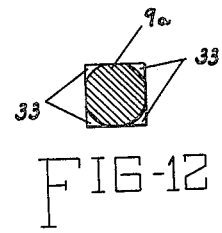
Fig. 12 represents a transverse section of the structure shown in Fig. 11 taken approximately along the plane indicated by the line 12—12 of that figure, with the washer removed.

The bar 9a of Figs. 11 and 12 represents, in a modified form, the bars 9 and 10 described above. As is shown most clearly in Fig. 12, the bar 9a has its edges, where the rubber bushing is to be located, removed to form shoulders 33 but it is not reduced to a cylindrical form. The shoulders 33 provide abutments for the washer 17a against which the rubber bushing 13 presses when a compressive force is exerted against it to cause adherence to the bar 9a and the surrounding sleeve of the general type shown at 14, 15. It will be noted in Fig. 12 that part of the faces are flat and part of them are sections of a cylinder, there being edges between the various faces which will help to reduce the possibility of slippage between the rubber bushing and the bar.

Figure 9:
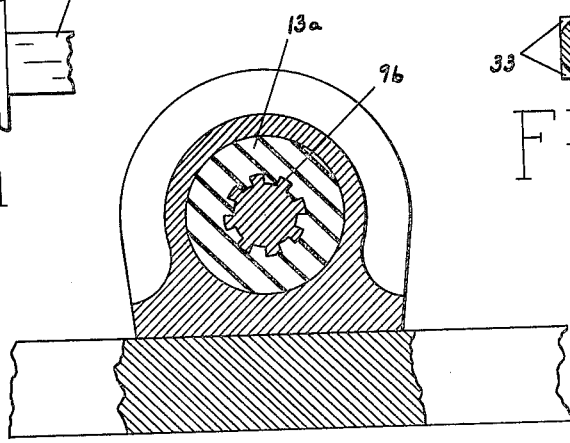
Fig. 9 represents a vertical section through another type of a flexible bearing for the tandem frame.

Fig. 9 shows a modified form in which the end portion of the bar 9b is fluted for the purpose of providing an even better bond between the shaft and the rubber bushing 13a.

Any type of bushing shown in Figs. 3, 4, 5, and 9 may be used to connect axle 11 or stub-axles 11a to the springs 28.

It is believed that the operation of this construction is obvious from the attached drawings and the foregoing description, and it will of course be understood that the specific description of structure set forth above may be departed from without departing from the spirit of this invention as described in this specification and defined in the appended claim.

Having now described my invention, I claim:

A structure of the character indicated comprising a quadrilateral frame of which the forward and rearward elements are axles upon which vehicle wheels are mounted, said axles having loops adjacent the wheels to receive the other elements of the frame, said other elements comprising lateral elements connecting the forward and rearward elements adjacent the wheels, spool-shaped rubber bushings connecting the frame elements at the corners of the quadrilateral frame, said bushings being under compression in the loops sufficient to prevent slipping between the rubber and the frame elements but allowing distortion of the frame in all directions, vehicle side frame members to which the quadrilateral frame is connected, the connecting means between the vehicle side frame members and the quadrilateral frame comprising loops, shaft-like means and rubber bushings connecting the loops and shaft-like means, the last mentioned bushings allowing distortion of the quadrilateral frame under stress and causing return of said frame to normal shape upon removal of said stress.

WILLIAM E. MARTIN.

REFERENCES CITED

The following references are of record in the file of this patent:

UNITED STATES PATENTS

| Number | Name | Date |
| --- | --- | --- |
| 1,692,891 | Fegeol | Nov. 27, 1928 |
| 1,739,450 | Fageol | Dec. 10, 1929 |
| 2,103,381 | Perkins et al. | Dec. 28, 1937 |
| 2,237,575 | Quartullo | Apr. 8, 1941 |
| 2,297,483 | Kuhne | Sept. 29, 1942 |
| 2,358,518 | Kraft | Sept. 19, 1944 |